United States Patent
Leon et al.

(10) Patent No.: US 7,109,252 B2
(45) Date of Patent: Sep. 19, 2006

(54) TMXDI-BASED OLIGOMER AND FORMULATIONS CONTAINING IT

(75) Inventors: Joseph A. Leon, West Simsbury, CT (US); Kenneth W. Swiderski, North Canaan, CT (US); Joseph D. DeSousa, Waterbury, CT (US); Richard W. Finch, Northford, CT (US)

(73) Assignee: Bomar Specialties Company, Winsted, CT (US)

( * ) Notice: Subject to any disclaimer, the term of this patent is extended or adjusted under 35 U.S.C. 154(b) by 0 days.

(21) Appl. No.: 10/995,622

(22) Filed: Nov. 23, 2004

(65) Prior Publication Data

US 2005/0119438 A1    Jun. 2, 2005

Related U.S. Application Data

(60) Provisional application No. 60/525,082, filed on Nov. 25, 2003.

(51) Int. Cl.
*C08F 2/46* (2006.01)
*C08G 18/66* (2006.01)
*C08G 18/67* (2006.01)
*C08G 18/72* (2006.01)

(52) U.S. Cl. .............................. 522/90; 522/96; 528/65
(58) Field of Classification Search .................. 522/96, 522/173, 90; 528/65, 59
See application file for complete search history.

(56) References Cited

U.S. PATENT DOCUMENTS

| 4,588,802 | A | * | 5/1986 | Chang | .......................... | 528/58 |
| 5,051,464 | A | * | 9/1991 | Johnson et al. | .............. | 524/555 |
| 5,204,379 | A | * | 4/1993 | Kubota et al. | ................. | 522/96 |
| 5,578,693 | A | * | 11/1996 | Hagstrom et al. | ............ | 528/75 |
| 2003/0220446 | A1 | * | 11/2003 | Faler et al. | ................. | 524/590 |

* cited by examiner

*Primary Examiner*—Susan Berman
(74) *Attorney, Agent, or Firm*—Ira S. Dorman

(57) ABSTRACT

The meta tetramethylxylenediisocyanate-based polyether urethane acrylate oligomer reduces the viscosities of polymerizable formulations, as compared to other isocyanate-based oligomers, significantly enhances adhesion to certain substrates, and imparts increased elongation-to-break valves to cured products produced therefrom.

14 Claims, No Drawings

TMXDI-BASED OLIGOMER AND FORMULATIONS CONTAINING IT

CROSS-REFERENCE TO RELATED APPLICATION

This application claims the benefit of U.S. Provisional Patent Application No. 60/525,082, filed Nov. 25, 2003, the entire specification of which is incorporated hereinto by reference thereto.

BACKGROUND OF THE INVENTION

Aliphatic polyether urethane acrylate oligomers are widely used as ingredients in radiation-curable formulations for producing films, coatings, adhesives, and the like. When formulated with monofunctional monomers, films containing such oligomers may be highly flexible, elastomeric and tacky. The oligomers may also serve as base resins, adhesion promoters, and reactive tackifiers in pressure-sensitive and laminating adhesive formulations that exhibit significantly improved adhesion to a wide variety of films and foils.

One oligomer having the foregoing attributes is commercially available from Bomar Specialties Co., of Winsted, Conn., under the trade designation BR-3741AB. That oligomer is a reaction product of a propylene oxide-based polyol (i.e., alpha-hydroxy, omega-hydroxy poly[oxy(methyl-1,2-ethanediyl)]) with 1,1'-methylenebis[4-isocyanatocyclohexane], end-capped with 2-hydroxyethyl acrylate (HEA).

SUMMARY OF THE INVENTION

It is a broad object of the present invention to provide a novel isocyanate-based oligomer that leads to desirable properties in cured products in which it is employed, and to provide novel formulations containing it.

It is a more specific object of the invention to provide such an oligomer that is well suited for use in formulations that are curable to films, coatings, adhesives, and like solid products; that is of reduced viscosity in comparison to similar isocyanate-based oligomers; that affords significantly enhanced adhesion to certain substrates having low surface tension ("low-energy surfaces"), such as polyethylene, polypropylene, and the like; and that may impart increased elongation-to-break values to products produced from formulations in which it is incorporated.

It has now been found that certain of the foregoing and related objects of the invention are attained by the provision of an oligomer comprised of an end-capped reaction product of meta tetramethyl xylene-diisocyanate [1,3-bis(1-isocyanato-1-methylethyl)benzene] (TMXDI) with a polyol polyether having a molecular weight in the range 400 to 12,000, and preferably 1,000 to 8,000, g/mol, the end-capping monomers being at least one hydroxyl-terminated (meth)acrylate monomer and at least one $C_{1-36}$ straight or branched chain alcohol. Normally: the TMXDI and endcapping monomers are reacted at a mole ratio of about 1:2:2; the (meth)acrylate monomer and the alcohol are reacted at a mole ratio to one another of about 0.5:1 to 3:1; the ratio of the (meth)acrylate monomer to the alcohol is at least 1:1; and the TMXDI and polyol polyether are reacted in such relative amounts as to provide a ratio of equivalents of isocyanate to polyol of about 1.3:1 to 2.2:1.

The preferred oligomer is the reaction product of TMXDI with a 4000 molecular weight propylene oxide-based polyol of very low monol content (i.e., alpha-hydroxy, omega-hydroxy poly [oxy(methyl-1,2-ethanediyl)]), commercially available from Bayer, of Pittsburgh, Pa., as ACCLAIM 4000, in which HEA and 1-docosanol (behenyl alcohol) are employed as end-capping agents; the oligomer has the structural formula:

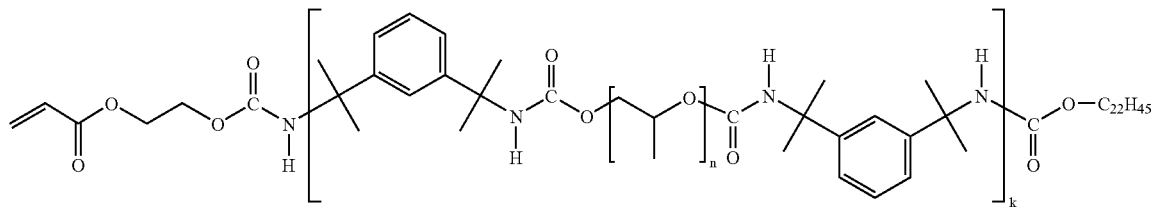

wherein "n" has a value of 8 to 175 and "k" has a value of 1 to 4.

Other objects of the invention are attained by the provision of a formulation that is curable to a solid product, comprised of about 90 to 10 weight percent of the TMXDI-based polyurethane acrylate oligomer described and, conversely, about 10 to 90 weight percent of a (meth)acrylate monomer. The formulation will usually additionally include about 1 to 10 weight percent of a photoinitiator.

DETAILED DESCRIPTION OF THE INVENTION

The preferred oligomer of the invention can be produced by a reaction scheme in which the diisocyanate and catalyst (e.g., dibutyltin dilaurate) are added to HEA, followed by heating to about 80° C. and maintenance of that temperature for a period of about two hours. The behenyl alcohol is then added, the reaction mixture is held at a temperature of about 70° C. to 80° C. for an additional one-hour period and, after reduction of the temperature to about 60° C., the polyol is introduced (together with an antioxidant), the 60° C. temperature then being maintained to completion of the reaction.

As an alternative, more generalized reaction scheme, a selected amount of polyol is added, at ambient temperature, to a glass reactor containing a stirrer and thermocouple, placed in a water bath. An amount of TMXDI is added to the reactor such that the ratio of equivalents of isocyanate to polyol is between 1.3:1 and 2.2:1. Mixing is commenced and heat is applied to the reactor; when the reaction mixture reaches 50° C. dibutyl tin dilaurate is added in an amount equal to 500 parts per million, based upon the weight of polyol.

The reaction mixture is allowed to heat to 80° C. and is maintained at that temperature for two hours, at which time a monofunctional alcohol is added as a partial capping agent, in an amount selected to be at an equivalent weight ratio of the alcohol to unreacted isocyanate of between 0.1:1 and 0.8:1, but preferably between 0.3:1 and 0.5:1. The reaction is allowed to continue for one hour, at 80° C.; then the temperature is reduced to 60° C., and a conventional monomeric acrylate capping agent is added in an amount equal, on an equivalency basis, to the theoretical amount of isocyanate groups remaining after all the hydroxyls of the polyol and alcohol had been reacted; about 300 to 1000 parts per million of an antioxidant, such as 4-methoxyphenol, is also added to the reaction mixture. Reaction is continued at 60° C. for eight additional hours, and the mixture is then allowed to cool to room temperature. Confirmation of the structure of the resultant oligomer is obtained using infrared spectroscopy, gel permeation chromatograpy, or another standard analytical technique.

As another alternative, a so-called "reverse addition" technique can be employed in which the end-capping compounds are added incrementally to a quantity of TMXDI heated to about 60° C. and containing a catalyst, followed, after a period of about two hours, by the addition of the polyol. The reaction is brought to completion at a temperature of 60° C. to 70° C.

Illustrative of the efficacy of the present invention are the following specific examples:

EXAMPLE ONE

The preferred TMXDI-based oligomer described above is mixed, in both 70:30 and 50:50 ratios, with isobornyl acrylate (IBOA), and two weight percent of IRGACURE 184 photoinitiator (Ciba Specialty Chemicals, of Tarrytown, N.Y.) is added to each of the formulations (which are hereinafter identified as XP-1, and XP-2, respectively), curing thereafter being effected by UV initiation. For comparison, the same two formulations, in which however the TMXDI-based oligomer is replaced by the BR-3741AB oligomer hereinabove described (the resulting prior art formulations hereinafter being identified as BR-1 and BR-2, respectively), are prepared and cured. The viscosities of the uncured formulations (measured at 25° C. using a Brookfield viscometer fitted with a small-sample adapter), the measured elongation-to-break values (expressed as percentages), and the levels of adhesion to certain substrates exhibited by the cured samples, are set forth in TABLE ONE below:

TABLE ONE

|  | XP-1 | BR-1 | XP-2 | BR-2 |
|---|---|---|---|---|
| Viscosity, cP | 12,000 | 22,800 | 2,350 | 5,150 |
| Elongation (ASTM D882) | 5,284 | 1,050 | 3,926 | 1,022 |

TABLE ONE-continued

|  | XP-1 | BR-1 | XP-2 | BR-2 |
|---|---|---|---|---|
| Spot Adhesion (ASTM D3808) | | | | |
| Stainless Steel | M | H | H | H |
| Steel (CRS) | M | M | H | H |
| Aluminum | L–M | L–M | H | M–H |
| Glass | L–M | L–M | H | M |
| Polycarbonate | L | L–M | L | M–H |
| HDPE (untreated) | M | L | M | L |

As can be seen, the oligomer embodying the invention effects dramatic reductions in the viscosities of the formulations prepared, as well as increases in the elongation-to-break values exhibited by the cured products. It also produces improved adhesion to certain substrates (albeit resulting in reduced adhesion to others), most notably to high density polyethylene and (at the 50:50 level) to aluminum and glass ("H" indicates that the cured adhesive will not release from the substrate; "M" indicates that it will release, but with great difficulty; and "L" indicates that the adhesive will release with some resistance).

EXAMPLE TWO

Six TMXDI-based oligomers are produced (Exp. No. 1–6) by introducing 600 g (0.298 equivalent) of a polypropylene oxide based diol (4000 g/mol molecular weight OH# 28, from Bayer Chemical) into a glass reaction vessel, to which is added 54.56 g (0.447 equivalent) of TMXDI (Cytec Industries Corp), and mixing is started. The reaction mixture is heated to 50° C., and 0.30 g of DBTDL catalyst is added. The temperature of the reaction mixture is then raised to 80° C. and maintained for two hours, after which time 0.0491 equivalent of a selected alcohol is added, and the reaction mixture is maintained for one hour at temperature; the alcohols used, and the weights thereof, are set forth in TABLE TWO, below. The temperature of the reaction mixture is then reduced to 60° C., and 0.0997 equivalent of HEA plus 0.34 g of MEHQ are added to the reactor and the reaction is continued for eight additional hours at 60° C., after which time the mixture is allowed to cool to room temperature.

TABLE TWO

| Exp. No. | Alcohol | Equivalent Weight | Grams |
|---|---|---|---|
| 1 | n-Butanol | 74.1 g/mole | 3.64 |
| 2 | 1-Octen-3-ol | 128.2 g/mole | 5.60 |
| 3 | 1-Dodecanol | 186.3 g/mole | 9.15 |
| 4 | 2-Octyl Dodecanol | 298.6 g/mole | 14.67 |
| 5 | Behenyl Alcohol | 322.7 g/mole | 15.75 |
| 6 | Tetradecyl Eicosanol | 495.0 g/mole | 24.31 |

Each of the resulting oligomers is tested for its effect upon tensile and elongation (ASTM D882-01), viscosity (ASTM D2196-99), and spot adhesion, in comparison with two urethane acrylate oligomers, BR-3741 and BR-3042, available from Bomar Specialties Co. and widely used in commercial free radical cured (ultraviolet, electron beam, or peroxide-initiated) polymerization. It is to be noted that BR-3741 and BR-3042 are similar to the oligomers of the invention described hereinabove in that they are based upon 4000 molecular weight propylene oxide polyols, diisocyanates, and HEA endcaps, and are chain extended; they do not however contain the TMXDI component, or alcohol partial endcaps.

To enable tensile, elongation and spot adhesion tests to be performed, 70 parts of each of the foregoing oligomers is admixed with 30 parts of isobornyl acrylate and 2 parts of IRGACURE 184 photoinitiator. Curing is effected in a single pass, under a FUSION F-300 UV lamp, equipped with a six-inch "H" bulb, at a belt speed of 20 feet/minute. Seven substrates are used for adhesion tests: aluminum, steel, stainless steel, polyacrylic, HDPE, ABS, and glass. Spot adhesion is graded from 0 to 5, with 0 being no adhesion and 5 being the maximum level, usually showing cohesive failure. Samples used for tensile/elongation are prepared by casting films on glass which had been previously treated with a release agent; they are usually 4 mils thick and are cut into ½ inch wide strips; because the cured films exhibit high elongation the samples used are usually ¼ to ½ inch long (rather than being of the standard two-inch lengths). A Cheminstruments TT-1000 analyzer is used for data generation.

The results of the spot adhesion tests are set forth in TABLE THREE below, and the percent elongation data are set forth in TABLE FOUR:

TABLE 3

| Substrate: Oligomer | Aluminum | Steel | St. Steel | Acrylic | HDPE | ABS | Glass |
|---|---|---|---|---|---|---|---|
| BR-3042 | 0 | 1 | 1 | 2 | 0 | 1 | 0 |
| BR-3741 | 0 | 1 | 1 | 2 | 0 | 1 | 0 |
| Exp 1 | 4 | 4 | 4 | 2 | 4 | 2 | 3 |
| Exp 2 | 3 | 4 | 5 | 3 | 3 | 2 | 3 |
| Exp 3 | 4 | 4 | 4 | 2 | 3 | 2 | 3 |
| Exp 4 | 3 | 4 | 4 | 2 | 3 | 2 | 3 |
| Exp 5 | 3 | 4 | 4 | 2 | 3 | 2 | 3 |
| Exp 6 | 4 | 4 | 4 | 2 | 4 | 2 | 3 |

TABLE FOUR

| Oligomer | Elongation percent |
|---|---|
| 3042 | 70 |
| 3741 | 130 |
| Exp 1 | 4,176 |
| Exp 2 | 4,476 |
| Exp 3 | 4,604 |
| Exp 4 | 2,844 |
| Exp 5 | 3,680 |
| Exp 6 | 3,688 |

The data presented in TABLE THREE demonstrate that oligomers embodying the invention effect improved adhesion, as compared to conventional products. The data presented in TABLE FOUR demonstrate that the instant oligomers afford increased elongation values, again as compared to the conventional oligomers.

While the invention is predicated upon the use of TMXDI as the isocyanate component, considerable compositional and quantitative variation is possible in the other ingredients, and hence in the oligomers produced. The polyol employed is a linear or branched hydrocarbon molecule containing a plurality of hydroxyl end groups and providing a hydrocarbon backbone to the oligomer. The hydrocarbon portion (i.e., a non-aromatic portion containing a majority of methylene groups, which may contain internal and/or pendent unsaturation) of the polyol will usually have a molecular weight of about 600 to about 4,000 g/mol, as determined by gel permeation chromatography using methylene chloride as the solvent and as measured against polystyrene molecular weight standards. Because long-term stability of the cured resin increases as the degree of unsaturation decreases, fully saturated (i.e., hydrogenated) hydrocarbons are preferred. Suitable hydrocarbon polyols include, in addition to the propylene oxide-based polyol hereinabove identified, hydroxyl-terminated, fully or partially hydrogenated 1,2-polybutadiene; 1,2-polybutadiene polyol hydrogenated to an iodine number of from 9 to 21; fully or partially hydrogenated polyisobutylene polyol; and mixtures of such polyols.

One of the two endcapping agents employed will be an hydroxyl-terminated aliphatic acrylate or methacrylate conforming to the formula:

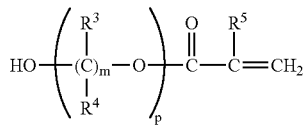

wherein $R^3$, $R^4$ and $R^5$ are independently selected from the group consisting of hydrogen, methyl, ethyl or propyl, m is an integer from 1 to 10, and p is 0 or 1. Suitable hydroxyl-terminated monoacrylates which may be used as the endcapping monomer include, in addition to the preferred HEA, 2-hydroxyethyl methacrylate, 3-hydroxypropyl acrylate, 3-hydroxypropyl methacrylate, and 4-hydroxyethyl acrylate, as well as other (meth)acrylates having hydroxyl functionality and mixtures of the foregoing.

The other endcapping monomer is provided by one or more straight chain or branched alcohols containing one to 36 carbon atoms. As indicated above, 1-docosanol preferred.

The molar ratio of the polyol, diisocyanate and endcapping monomer mixture is preferably approximately 1:2:2. The molar ratio of the acrylate and alcohol endcapping monomers is broadly 0.5:1 to 3:1; preferably, the ratio will be at least 1:1, and the most desirable ratio will generally be 2:1.

A catalyst will be employed, typically in the amount of 100 to 200 ppm, to increase the reaction rate among the polyol, the end-capping compounds, and the diisocyanate. Suitable catalysts include, in addition to dibutyltin dilaurate, dibutyltin oxide, dibutyltin di-2-hexoate, stannous oleate, stannous octoate, lead octoate, ferrous acetoacetate, and amines such as triethylamine, diethylmethylamine, triethylenediamine, dimethylethylamine, morpholine, N-ethylmorpholine, piperazine, N,N-dimethylbenzylamine, N,N-dimethyl-laurylamine, and mixtures thereof.

Radiation-curable formulations embodying the invention will usually comprise about 10 to 90 weight percent of the TMXDI-based oligomer and, conversely, about 90 to 10 weight percent of an alkyl acrylate or methacrylate monomer. As will be appreciated by those skilled in the art, a wide variety of monofunctional and polyfunctional acrylate and methacrylate nonomers can be employed in the instant formulations art (see for example U.S. Pat. Nos. 4,429,088 and 4,451,523). Nevertheless, the following acrylates and corresponding methacrylates, used alone or in combination with one another, might be identified: hydroxyethyl(meth)acrylate, hydroxyproply(meth)acrylate, ethylhexyl(meth)-acrylate isobornyl acrylate, tetrahydrofurfuryl acrylate, diethyleneglycol diacrylate, 1,4-butanediol diacrylate, butylene glycol diacrylate, neopentyl glycol diacrylate, octylacrylate and decylacrylate (normally in admixture), polyethyleneglycol diacrylate, trimethyl-cyclohexyl acrylate, benzyl acrylate, butyleneglycol diacrylate, polybutyleneglycol diacrylate, tripropyleneglycol diacrylate, trimethylolpropane triacrylate, di-trimethylolpropane tetraacrylate, pentaerythritol tetraacrylate, phenyl glycidyl ether acrylate, neodecanoate vinyl ester, ethoxylated phenoxy ethyl acrylate, and di-pentaerythritol pentaacrylate. The properties imparted to the composition will generally vary in proportion to the amount used and number of acrylate groups present in the molecule, and optimal concentrations will consequently be selected accordingly. The formulations will normally include about one to ten weight percent a suitable initiator, especially a UV photoinitiator, and they may contain other materials such as organosilane adhesion promoters, chain-transfer agents, and stabilizers.

Thus, it can be seen that the present invention provides a novel isocyanate-based oligomer that leads to desirable properties in cured products in which it is employed, and novel formulations containing the oligomer. More specifically, the invention provides such an oligomer that is well suited for use in formulations that are curable to films, coatings, adhesives, and the like; that is of reduced viscosity in comparison to similar isocyanate-based oligomers; that affords significantly enhanced adhesion to certain substrates, such as polyethylene, polypropylene, and other substrates of low surface tension; and that may impart increased elongation-to-break values to products produced from formulations in which it is incorporated.

What is claimed is:

1. As a composition of matter, the polyurethane acrylate oligomer having the structural formula:

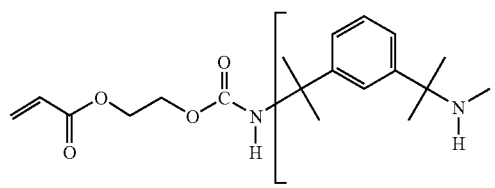

-continued

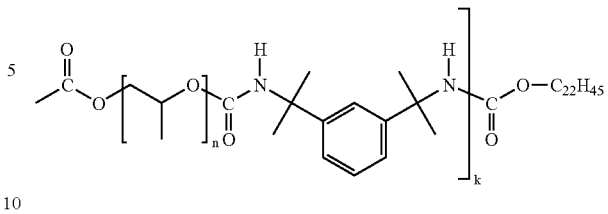

wherein n has a value of 8 to 175 and k has a value of 1 to 4.

2. A polyurethane acrylate oligomer comprised of the reaction product of meta tetramethyl xylene dissocyanate and a polyol polyether having a molecular weight of about 400 to 12,000, end-capped with at least one hydroxyl-terminated (meth)acrylate monomer and at least one $C_{1-36}$ straight or branched chain monohydric alcohol.

3. The oligomer of claim 2 wherein said polyol polyether, meta tetramethyl xylene dissocyanate and endcapping monomers are reacted at a mole ratio of about 1:2:2.

4. The oligomer of claim 2 wherein said (meth)acrylate monomer and said monohydric alcohol are reacted at a mole ratio of about 0.5:1 to 3:1.

5. The oligomer of claim 4 wherein said ratio of said (meth)acrylate monomer to said monohydric alcohol is at least 1:1.

6. The oligomer of claim 2 wherein said meta tetramethyl xylene dissocyanate and polyol polyether are reacted in such relative amounts to provide a ratio of equivalents of isocyanate to polyol of about 1.3:1 to 2.2:1.

7. A formulation that is curable to a solid product comprised of about 90 to 10 weight percent of the polyurethane acrylate oligomer of claim 1 and, conversely, about 10 to 90 weight percent of a (meth)acrylate monomer.

8. The formulation of claim 7 additionally including about 1 to 10 weight percent of a photoinitiator.

9. A formulation that is curable to a solid product comprised of about 90 to 10 weight percent of the polyurethane acrylate oligomer of claim 2 and, conversely, about 10 to 90 weight percent of a (meth)acrylate monomer.

10. The formulation of claim 9 additionally including about 1 to 10 weight percent of a photoinitiator.

11. As a composition of matter, a polyurethane acrylate oligomer having the structural formula:

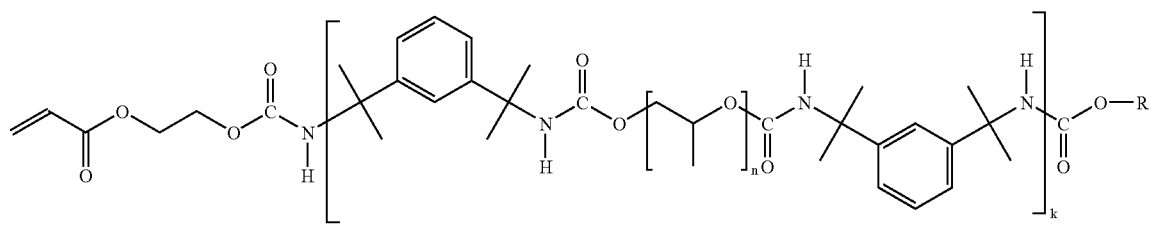

wherein n has a value of 8 to 175, k has a value of 1 to 4, and R is a straight or branched chain alkyl group containing 1 to 36 carbon atoms.

12. The composition of claim 11 wherein said alkyl group contains 4 to 34 carbon atoms.

13. A formulation that is curable to a solid product comprised of about 90 to 10 weight percent of a polyurethane acrylate oligomer of claim 11 and, conversely, about 10 to 90 weight percent of a (meth)acrylate monomer.

14. The formulation of claim 13 additionally including about 1 to 10 weight percent of a photoinitiator.

* * * * *